May 21, 1935.　　H. M. KIECKHEFER ET AL　　2,002,013
HANDLE CONSTRUCTION FOR BASKETS
Filed Dec. 8, 1933　　2 Sheets-Sheet 1
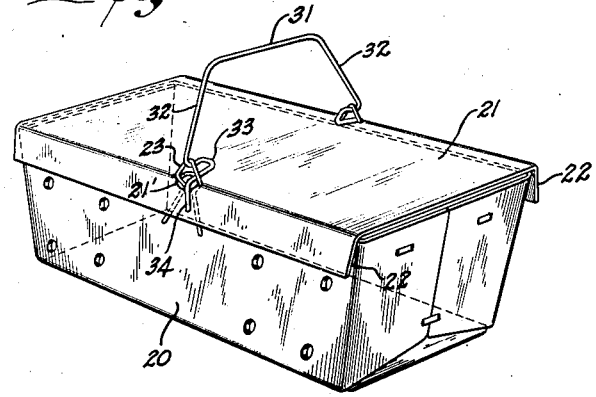
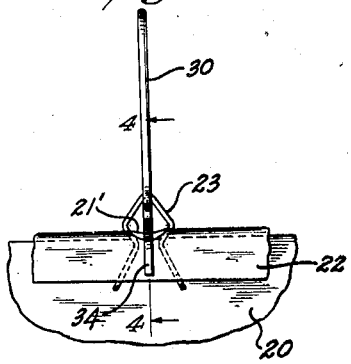
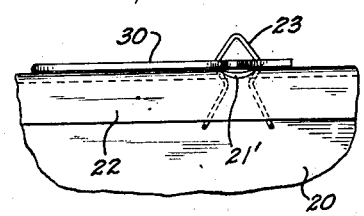
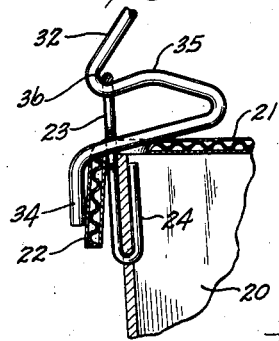
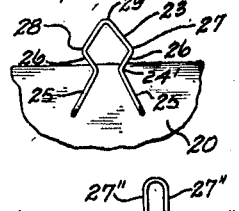
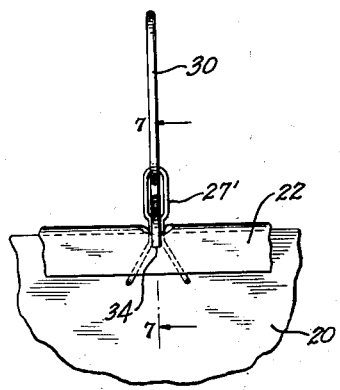
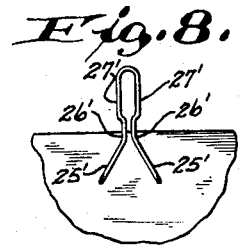
INVENTORS
Herbert M. Kieckhefer
Webster R. Dock
BY
Morsell Lieber & Morsell
ATTORNEYS.

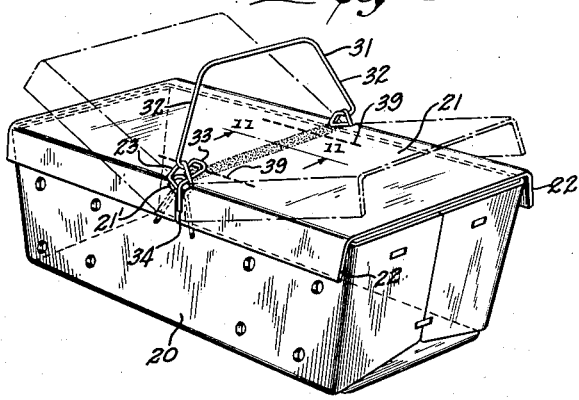
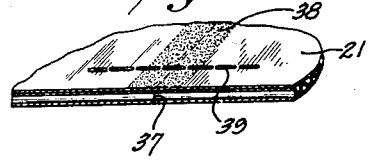
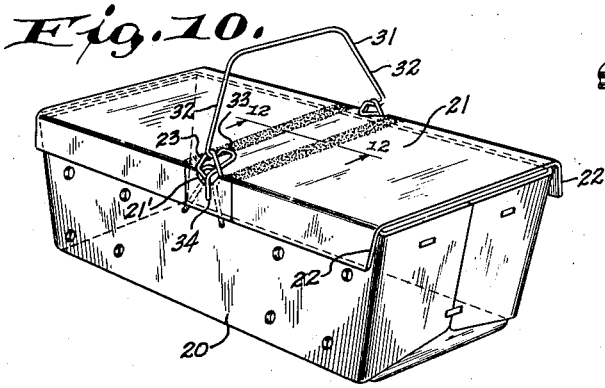
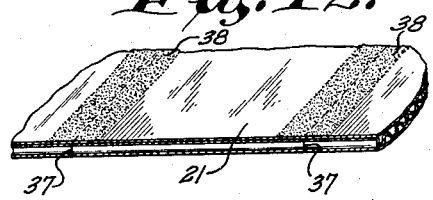
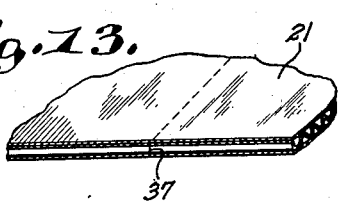
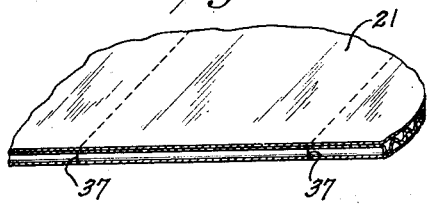
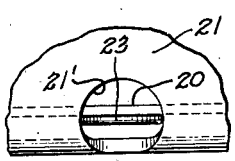

Patented May 21, 1935

2,002,013

UNITED STATES PATENT OFFICE 2,002,013

HANDLE CONSTRUCTION FOR BASKETS

Herbert M. Kieckhefer, Riverton, N. J., and Webster R. Dock, Milwaukee, Wis., assignors to Kieckhefer Container Company, Milwaukee, Wis., a corporation of Maine Application December 8, 1933, Serial No. 701,436

9 Claims. (Cl. 229—52)

This invention relates to improvements in receptacles and more particularly to receptacles of the basket type.

Heretofore, various forms of handles applicable to wooden baskets have been proposed wherein ears on the sides of the basket are cooperable with a metallic handle and with the basket cover. The present invention relates more particularly to a construction for use with a paperboard basket having a cover formed with side flanges, and the present invention provides handle ends and basket ears which are constructed to cooperate in a novel manner to properly maintain the handle and basket cover in desired positions.

A more specific object of the present invention is to provide in a basket having a cover provided with side flanges, ears on the basket adapted to project thru apertures in said cover, and a handle having ends constructed to so cooperate with said ears that the handle may be maintained in an upright position either when the cover is removed or when it is in position on the basket, said construction also being such that when one form of ear is utilized the handle may be maintained in a pivoted position parallel to the basket top for convenience in stacking.

A further object of the invention is to provide in a construction as above described, ears so shaped with relation to the apertures of the cover that they will serve to temporarily hold the cover in position prior to insertion of the handle.

A further object of the invention is to provide in a receptacle having a cover and a handle for normally maintaining the cover in position, means permitting lifting of a desired portion of the cover to gain access to the interior without removing the handle.

A more specific object of the invention is to provide in a construction as above described, one or more transverse lines of scoring in the cover to facilitate bending of portions thereof, the material of the cover being preferably reinforced along the lines of scoring to prevent severance of the parts during bending.

A further object of the invention is to provide a receptacle of the basket type which is simple in construction, inexpensive to manufacture, durable, neat in appearance, and well adapted for the purpose described.

With the above and other objects in view, the invention consists of the improved receptacle and all its parts and combinations as set forth in the claims and all equivalents thereof.

In the accompanying drawings illustrating several preferred embodiments of the invention, in which the same reference numerals designate the same parts in all of the views;

Fig. 1 is a perspective view of a basket showing the cover and handle in assembled position;

Fig. 2 is an enlarged fragmentary side elevational view showing the handle in upright position;

Fig. 3 is a similar view showing the handle in a position parallel to the cover;

Fig. 4 is an enlarged fragmentary sectional view taken on line 4—4 of Fig. 2;

Fig. 5 is a fragmentary side view of the upper edge of the basket showing one of the handle-receiving ears;

Fig. 6 is a view similar to Fig. 2 showing a modified form of ear;

Fig. 7 is an enlarged fragmentary sectional view taken on line 7—7 of Fig. 6;

Fig. 8 is a fragmentary side elevational view showing the upper edge of the receptacle with the ear of the type shown in Fig. 6 attached thereto;

Fig. 9 is a perspective view of a basket showing a cover so formed that portions may be lifted to gain access to the interior, the dotted lines indicating lifted positions of the cover;

Fig. 10 is a perspective view of a basket showing the cover formed with a pair of spaced-apart lines of scoring, as distinguished from the single line of scoring shown in Fig. 9;

Fig. 11 is an enlarged sectional view taken on line 11—11 of Fig. 9;

Fig. 12 is a similar view taken on line 12—12 of Fig. 10;

Figs. 13 and 14 are similar sectional views showing slightly modified forms of a cover construction;

Fig. 15 is a fragmentary detail plan view of the edge of the cover showing the ear of the type illustrated in Fig. 5 as it is being inserted thru the aperture;

Fig. 16 is a similar view showing the locking position of the ear after it has been inserted thru the aperture in the cover; and Fig. 17 is a view similar to Fig. 8 showing a slight modification of the type of ear there illustrated.

Referring first to Figs. 1–5 inclusive, the numeral 20 designates the basket body and the numeral 21 one form of cover therefor, said cover being formed with downwardly extending side flanges 22. Both the basket and cover are preferably formed of paperboard, fiberboard, or the like. It is, however, not desired to be limited to this type of material, as certain features of the invention are obviously applicable more generally to wooden or other types of baskets.

Secured to the upper edge of each of the side walls of the body 20, approximately at the center thereof, are ears 23 as shown in Fig. 5, said ears being preferably formed of wire having sufficient rigidity to maintain its shape under normal conditions but being slightly yielding. These ears each have a pair of prongs 24 which extend thru and are bent upwardly into engaging position with the inner surface of the side wall. On the outer surface of the side wall the legs of the ears converge, as at 25, but terminate short of meeting. The legs then diverge to a position above the upper edge of the basket, as at 26, and then again converge to a point of meeting at the top. It will thus be seen that each ear is, therefore, formed with a substantially diamond-shaped upper portion defined by the corner portions 27, 28, 29, and the upper edge of the basket.

The handle designated generally by the numeral 30, is preferably formed of wire which is somewhat heavier than the wire forming the ears. This handle comprises a horizontal top portion 31 and diverging leg portions 32. At their lower ends, the leg portions are looped inwardly as at 33, and the extreme end of each leg is in the form of a substantially vertically extending part 34. The upper part of each loop 33 is formed with a hump or raised portion 35, so that a pocket is defined as at 36 between said hump and the upwardly extending part 32 of the handle.

The cover 21 is formed near each side edge and substantially centrally thereof with a substantially circular aperture 21', part of the aperture being formed in the downwardly extending flange 22.

In use, the cover is inserted over the ears 23 while the sides of the basket are pressed slightly inwardly. This is to permit the ears to pass thru the widest part of the apertures, as shown in Fig. 15. When the cover has been pushed down into engagement with the upper edge of the basket, the pressure on the sides is released and said sides will spring outwardly, carrying the ears to a position over a narrower portion of the apertures so that the cover is thereby locked in position even before the handle is inserted. The legs 32 of the handle are then spread somewhat apart so that the loops 33 may be inserted thru the projecting portions of the ears, in the manner shown in Figs. 1 and 4, and in view of the fact that said legs 32 of the handle yield somewhat inwardly, the corner 29 of each ear will ultimately be received by the pocket 36 in the manner shown in Fig. 4. The construction is such that the loop fits rather tightly between the corner 29 of the ear and the upper edge of the basket and due to the shape of the ear the handle will therefore be retained in an upright position when desired.

Due to the fact that it is frequently desired to stack the baskets with the covers in place, it is desirable to provide for movement of the handle to a position parallel to the cover. This can readily be accomplished in the manner shown in Fig. 3, the loops of the handle being then wedged between the corners 27 and 28 of the ears. Thus, the construction of the ears with diamond-shaped upper ends results in maintaining the handle in either the position of Fig. 1 or Fig. 3. Furthermore, even if the cover is removed and it is desired to have the handle on the basket, the construction will serve to maintain the handle in an upright position when desired.

In Figs. 6-8 inclusive, a slightly modified form of construction is illustrated wherein a different type of ear is used for receiving the same type of handle. This type of ear is designed to prevent lowering of the handle to the position of Fig. 3, as in certain types of use it is desirable to have the handle in upright position at all times.

This modified form of ear has prongs 24' which extend thru the sides of the basket and engage the inner surface thereof, and also has converging parts 25' on the outer surface of the basket sides. The converging parts above referred to terminate short of meeting and then extend substantially parallel to one another for a short distance above the upper edge of the basket, as at 26'. Next, the two parts diverge outwardly for a short distance and then upwardly in parallel relation, as at 27', so that the modified form of ear has its upper end in the form of a relatively narrow oval.

The same effect may be obtained in the manner shown in Fig. 17 wherein the converging parts 25'' converge to a point above the upper edge of the basket and then cross, as at 26''. The wire sections then extend parallel to one another, as at 27'', to form relatively narrow ovals identical to the ovals of Fig. 8.

It is apparent that when the loops 33 of the handle are inserted in these ovals that said loops will be wedged between the upper end of each oval and the restricted part near the upper edge of the basket sides. This type of ear will serve to hold the handle firmly in upright position either with or without the cover and the shape of the ears is such as to prevent movement of the handle to the position of Fig. 3.

If desired, the form of the invention shown in Fig. 5 may be formed so that the restricted portions 24' of the ears are closer together and above the upper edge of the basket so that the handle loops, when the handle is in upright position, may be wedged between the loop corners 29 and the restricted parts 25' to hold the handle above the basket edges as in the form of invention shown in Figs. 6, 7, and 8 and just described.

Inasmuch as it is frequently desirable to examine the contents of the basket or to gain access thereto, it is advantageous to permit this without making it necessary to remove the handle. For this reason the cover, which is preferably formed of corrugated board, may have its lower surface or liner cut or scored as indicated at 37 in Figs. 11 and 13, so that half of the cover can be bent upwardly on the line of cut or scoring in the manner shown by dotted lines in Fig. 9. In order to prevent the upper surface or liner of the cover from breaking too readily, a coating of ink or like material 38 may be used thereon. In view of the fact that the receptacle is preferably formed of paperboard which is impregnated with sulphur or other waterproofing material in the manner disclosed in copending application Serial No. 688,611, this strip of printing if placed on prior to impregnation will maintain the material therebelow in a relatively flexible condition for bending purposes.

The two parts of the cover may also be held together for bending purposes in various ways, and any type of reenforcement may be employed such as stitching with thread along a plurality of lines extending transversely to the line of bend, as indicated by the numeral 39.

As shown in Figs. 10, 12, and 14, it may be desirable to utilize a pair of spaced cuts or lines of scoring 37, each of which may be protected by printing or other reenforcement as at 38. With this arrangement, the two parts of the cover can be more readily lifted upwardly without interference from the handle.

From the above it may be readily seen that a very novel form of handle, ear, and cover construction has been devised which is particularly appplicable to paperboard baskets having flanged covers and in which the parts so cooperate as to positively maintain the handle and cover in desired positions.

What we claim is:

1. A receptacle comprising a body portion, handle-receiving ears secured to opposite sides of said body and having three-cornered loop portions projecting above the upper edges of said sides, and a handle having downwardly extending legs provided with oppositely disposed inwardly looped portions engageable from the outside between the uppermost corners of the loops of the ears and the upper edges of the receptacle to maintain the handle in upright position and being engageable between the other two corners of the loops of the ears to maintain the handle in a lowered position.

2. A receptacle comprising a body portion, handle-receiving ears secured to opposite sides of said body and projecting above the upper edges thereof, and a handle having oppositely disposed end portions engageable with said ears, said ends of the handle and the ears being so shaped as to cooperate with one another in maintaining the handle either in an upright position or in a position closely adjacent the top of the receptacle for stacking purposes.

3. A receptacle comprising a body portion, handle-receiving ears secured to opposite sides of said body and having substantially diamond-shaped portions projecting above the upper edges of said body, and a handle having oppositely disposed inwardly looped end portions engageable with said diamond-shaped portions of the ears to maintain the handle either in an upright position or in a position closely adjacent the top of the receptacle for stacking purposes.

4. A receptacle comprising a body portion, handle-receiving ears secured to opposite sides of said body and having centrally widened loop portions projecting above the upper edges of said sides, and a cover having oppositely disposed internal substantially circular apertures, said ears being insertable thru the center of said circular apertures of the cover while inward pressure is being exerted on the sides of the body, and the widened portions of the loops of the ears being movable to a position over a narrower portion of the cover apertures when the pressure on the receptacle sides is released to lock said cover in position.

5. A receptacle comprising a body portion, handle receiving ears disposed at opposite sides of said body, and a handle having oppositely disposed end portions engageable with said ears, said ends of the handle and the ears being so shaped as to cooperate with one another in maintaining the handle either in an upright position or in a position closely adjacent the top of the receptacle for stacking purposes.

6. A receptacle comprising a body portion, handle-receiving ears disposed adjacent opposite sides of said body and having centrally widened loop portions projecting above the upper edges of said sides, and a cover having oppositely disposed apertures formed with wide and narrow portions, said ears being insertable through the wide portions of said apertures of the cover while inward pressure is being exerted on the sides of the body, and the widened portions of the loops of the ears being movable to a position over a narrower portion of the cover apertures when the pressure on the receptacle sides is released to lock said cover in position.

7. A receptacle comprising a body portion, handle-receiving ears secured to opposite sides of said body and projecting above the upper edges thereof, a cover having side flanges and having oppositely disposed apertures adjacent said flanges for receiving said ears, and a handle having oppositely disposed inwardly looped end portions engageable from the outside with said ears to hold the cover in place, said loops terminating in projecting ends engageable with the exterior of the cover flanges to hold the latter close to the sides of the body.

8. A receptacle comprising a body portion, handle-receiving ears secured to opposite sides of said body and projecting above the upper edges thereof, a cover having side flanges and having oppositely disposed apertures adjacent said flanges for receiving said ears, and a handle having oppositely disposed inwardly looped end portions engageable from the outside with said ears to hold the cover in place, said loops terminating in ends which extend vertically adjacent the exterior of the cover flanges when the handle is up to hold said cover flanges close to the sides of the body.

9. A receptacle comprising a body portion, handle-receiving ears secured to opposite sides of said body portion and projecting above the upper edges thereof, a cover having oppositely disposed apertures for receiving said ears, and a handle having end portions engageable with said ears to hold the cover in place, said handle being movable from a substantially vertical carrying position to a position closely adjacent the top of the receptacle, said cover being scored for bending along a transverse line to permit access to the interior of the receptacle without removing the handle, and said handle when swung in one position against the cover serving to lock said bendable portion of the cover in closed position.

HERBERT M. KIECKHEFER.
WEBSTER R. DOCK.